(12) United States Patent
Ide (10) Patent No.: US 8,094,539 B2
(45) Date of Patent: Jan. 10, 2012

(54) OPTICAL INFORMATION DETECTION METHOD, OPTICAL PICKUP, AND OPTICAL INFORMATION RECORDING AND REPRODUCING APPARATUS

(75) Inventor: Tatsuro Ide, Kawasaki (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 185 days.

(21) Appl. No.: 12/538,947

(22) Filed: Aug. 11, 2009

(65) Prior Publication Data

US 2010/0039917 A1    Feb. 18, 2010

(30) Foreign Application Priority Data

Aug. 13, 2008  (JP) .................................. 2008-208702

(51) Int. Cl.
*G11B 7/00* (2006.01)

(52) U.S. Cl. .............................. 369/112.01; 369/112.16

(58) Field of Classification Search .................. None
See application file for complete search history.

(56) References Cited

U.S. PATENT DOCUMENTS

2008/0067321 A1* 3/2008 Miyamoto et al. ........ 250/201.5
2008/0205246 A1* 8/2008 Shimano et al. ......... 369/112.16

FOREIGN PATENT DOCUMENTS

| JP | 05-342678 | 12/1993 |
|----|-----------|---------|
| JP | 06-223433 | 8/1994 |
| JP | 2008-269680 | 11/2008 |

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

An interference-type optical pickup, an optical information detection method, and an optical information recording and reproducing apparatus, which allow easy adjustment of a path difference between two lights, have a high signal amplification effect and are suitable for size reduction of an optical system, are provided. A signal light reflected from an optical disk and a reference light branched from the same light source and guided into detectors without being projected onto the optical disk are caused to interfere with each other on detectors. Detector outputs in four interference states in which phase relationships between the reference light and the signal light are different from each other by degrees are simultaneously obtained and calculated. Accordingly, a readout signal RF that is always stable and amplified with high quality is obtained even when an optical path changes due to disk undulations. The four detector outputs are simultaneously obtained by use of four quadrant photo detectors, and are calculated, to thereby also obtain a servo signal.

12 Claims, 10 Drawing Sheets

Tangential direction

Radial direction

OPTICAL INFORMATION DETECTION METHOD, OPTICAL PICKUP, AND OPTICAL INFORMATION RECORDING AND REPRODUCING APPARATUS

CLAIM OF PRIORITY

The present application claims priority from Japanese patent application JP 2008-208702 filed on Aug. 13, 2008, the content of which is hereby incorporated by reference into this application.

CROSS REFERENCE TO RELATED APPLICATION

U.S. patent application Ser. No. 12/419,421 is a co-pending application of this application, the content of which is incorporated herein by cross-reference.

BACKGROUND OF THE INVENTION

1. Field of the Invention

The present invention relates to an optical information detection method, and relates to an improvement in the S/N ratio of a readout signal in an optical disk device, for example.

2. Background Art

Optical disks have almost reached their limit in terms of the resolution limit of the optical system with Blu-ray Disc (BD) by use of a blue-violet semiconductor laser and a high NA objective lens having been commercialized. A multilayer structure is expected to be dominant in the optical disks in the future to further increase the capacity. In a multilayer optical disk, the reflectance from a specific layer has to be kept small since the intensities of lights detected from respective layers are required to be substantially the same as each other. Meanwhile, in the optical disk, a transfer rate has also been continuously increased along with an increase in the capacity since it is necessary to increase the copying speed for videos or the like. If the transfer rate continues to be increased, a sufficient S/N ratio of a readout signal cannot be ensured. Thus, it is necessary to improve the S/N ratio of a detected signal to achieve the multilayer structure and the higher rate at the same time.

A technique regarding the improvement in the S/N ratio of the readout signal of the optical disk is described in JP Patent Publication (Kokai) Nos. 05-342678A (1993) and 06-223433A (1994), for example. Both of JP Patent Publication (Kokai) Nos. 05-342678A (1993) and 06-223433A (1994) relate to the improvement in the S/N ratio of the readout signal of a magneto-optical disk, and intend to amplify the amplitude of a faint signal by branching a light from a semiconductor laser before the light is projected onto an optical disk, combining a light which is not projected onto the optical disk with a reflected light from the optical disk to cause interference therebetween, and thereby increasing the intensity of the light which is not projected onto the optical disk. In differential detection between a transmitted light and a reflected light of a polarizing beam splitter that has been conventionally used in signal detection for the magneto-optical disk, the detection is performed basically by causing original incident polarization components and polarization components perpendicular to an incident polarization direction produced by polarization rotation by the magneto-optical disk to interfere with each other, and amplifying the perpendicular polarization components with the incident polarization. Accordingly, when the original incident polarization components are increased, the signal can be increased. However, in order to prevent data from being deleted or overwritten, the intensity of the light incident on the optical disk needs to be suppressed to a certain level or less. On the other hand, in the conventional techniques described above, a light caused to interfere with a signal light is separated from the signal light in advance, and the light is caused to interfere with the signal light without focusing the light onto the disk. Thus, the intensity of the light caused to interfere with the signal light for signal amplification can be increased regardless of the light intensity on the disk surface. Accordingly, in principle, as the light intensity is stronger within the allowable range of the intensity, a higher S/N ratio can be obtained in comparison with the noise of an amplifier for converting a photocurrent from a photo detector into a voltage, and the shot noise occurring in the photo detector.

In JP Patent Publication (Kokai) No. 05-342678A (1993), an interference intensity is detected by causing two lights to interfere with each other. The optical path length of the light which is not reflected from the disk and caused to interfere with the signal light is made variable, thereby ensuring the amplitude of an interference signal. In JP Patent Publication (Kokai) No. 06-223433A (1994), the differential detection is also performed in addition to the interference intensity detection. The intensity component of each light which does not contribute to the signal is thereby canceled, and the noise component of the light is canceled, thereby improving the S/N ratio. A non polarizing beam splitter is used for the differential detection in this case.

SUMMARY OF THE INVENTION

Each of the interferometer optical systems used in the aforementioned conventional techniques is a Mach-Zehnder type optical system, which has many optical parts and is thus not suitable for size reduction of the optical system. The Mach-Zehnder type interferometer optical system is an interferometer which separately includes means for dividing a light into a signal light and a reference light first, and means for combining again the signal light after any modulation is applied to the signal light as a signal with the reference light again to cause interference therebetween. On the other hand, a Twyman-Green or Michelson type interferometer optical system returns again the signal light and the reference light to the means for dividing the light first to cause interference therebetween. The reason why the Mach-Zehnder type optical system is used in the aforementioned conventional examples is not described in detail in JP Patent Publication (Kokai) Nos. 05-342678A (1993) and 06-223433A (1994). However, the reason is assumed to be that, since the signal light of the magneto-optical disk is produced by polarization rotation, a half wave plate ($\lambda/2$ plate ($\lambda$: wavelength)) whose rotation can be adjusted to adjust the polarization direction of the light for interference needs to be arranged in an optical path where the interference occurs such that the light is transmitted not in both directions but only in one direction. Furthermore, as another problem, a method of adjusting a path difference between the two lights is not specifically described therein, and the techniques are difficult to put into practical use. As a solution to the problem, it is described in JP Patent Publication (Kokai) No. 06-223433A (1994) that a reference mirror for obtaining the light for interference is arranged on the disk at a position spaced apart from a recording film. However, this solution is to propose a new disk standard, and not to improve the S/N ratio in the existing disk.

The present invention has been made in view of the aforementioned problems, and it is an object of the present invention to provide an interference-type optical pickup, an optical information detection method, and an optical information recording and reproducing apparatus, which allow easy adjustment of a path difference between two lights, which have a high signal amplification effect, and which are suitable for size reduction of an optical system.

In the present invention, a light beam emitted from a light source is divided into a first light beam and a second light beam. The first light beam is focused onto an optical information recording medium. A signal light reflected from the optical information recording medium is guided to four detectors. The second light beam is guided to the four detectors as a reference light without focusing the second light beam onto the optical information recording medium. The signal light and the reference light are caused to optically interfere with each other on the four detectors such that phase relationships between the signal light and the reference light are different from each other. Outputs from the four detectors are calculated, thereby obtaining a readout signal.

To be more specific, the phase relationships between the signal light and the reference light are different from each other by 180 degrees on the first and second detectors, by 180 degrees on the third and fourth detectors, and by 90 degrees on the first and third detectors. Accordingly, out of a phase relationship of 360 degrees, four phase states shifted from each other by 90 degrees can be detected at the same time. Since the readout signal sinusoidally varies in accordance with a change of 360 degrees in the light phase state, a signal state in any given phase state can be reproduced based on an operation by observing four signals in phase states shifted from each other by 90 degrees. That is, stable reproduction and detection in any given phase state can be achieved.

As the above operation, the square of a differential signal between the first detector and the second detector is added to the square of a differential signal between the third detector and the fourth detector. The set of the first and second detectors and the set of the third and fourth detectors are out of phase with each other by 90 degrees. Thus, when the differential output of the former is a sine, the differential output of the latter is a cosine. Accordingly, by calculating the square sum of the both signals, a constant maximum output signal can be obtained at all times.

As another operation method, the readout signal is obtained by adding a square-root operation to the above operation. By performing an operation as described above, a readout signal that is proportional to the optical output of the light source can be obtained.

As another operation method, quadrant photo detectors are employed as the first, second, third and fourth detectors. The square of a differential signal between each area of the first detector and each area of the second detector is added to the square of a differential signal between each area of the third detector and each area of the fourth detector. By calculating the square sum of the two differential signals in each of the areas, a constant output signal can be obtained at all times. The output signals respectively obtained from the areas are further added, thereby obtaining an RF signal. Furthermore, a differential operation is performed on the output signals respectively obtained from the areas by employing an astigmatic method in the detection of a focus error signal by adding astigmatism to a combined light obtained by combining the signal light and the reference light, and by employing a push-pull method in the detection of a tracking error signal. A servo signal such as a focus error signal and a tracking error signal can be thereby obtained.

The plurality of photo detectors as detection means may be formed on the same substrate. The optical system is thereby prevented from increasing in size. Accordingly, signal amplification can be stably performed, and the optical system can be formed into a small size.

Means for detecting the focus error of the signal light on the optical information recording medium as a signal is further provided. Based on the focus error signal, means for focusing the signal light is controlled to compensate for the focus error, and a path difference between the signal light and the reference light is adjusted to be within the coherence length of the light source by providing means for adjusting the optical path length of the reference light in the optical path of the reference light. Accordingly, even when an objective lens is driven in an optical axis direction by focus control and the optical path length from the means for dividing the light into the signal light and the reference light to the optical information recording medium is thereby changed to be longer than the coherence length of the light source, a signal amplification effect can be maintained by maintaining coherence between the signal light and the reference light.

With the present invention, an interference-type optical pickup, an optical information detection method, and an optical information recording and reproducing apparatus, which allow easy adjustment of a path difference between two lights, which have a high signal amplification effect, and which are suitable for size reduction of an optical system, can be provided. Accordingly, in a case where the reflectance of each layer needs to be kept small such as a multilayer optical disk, or in a case where a reproduction speed is fast and noise is thus increased relative to the signal, the readout signal can be improved in quality by signal amplification.

DETAILED DESCRIPTION OF THE PREFERRED EMBODIMENTS

In the following, embodiments of the present invention will be described with reference to the drawings.

[Entire Configuration of Optical Information Recording and Reproducing Apparatus]

Figure 1:
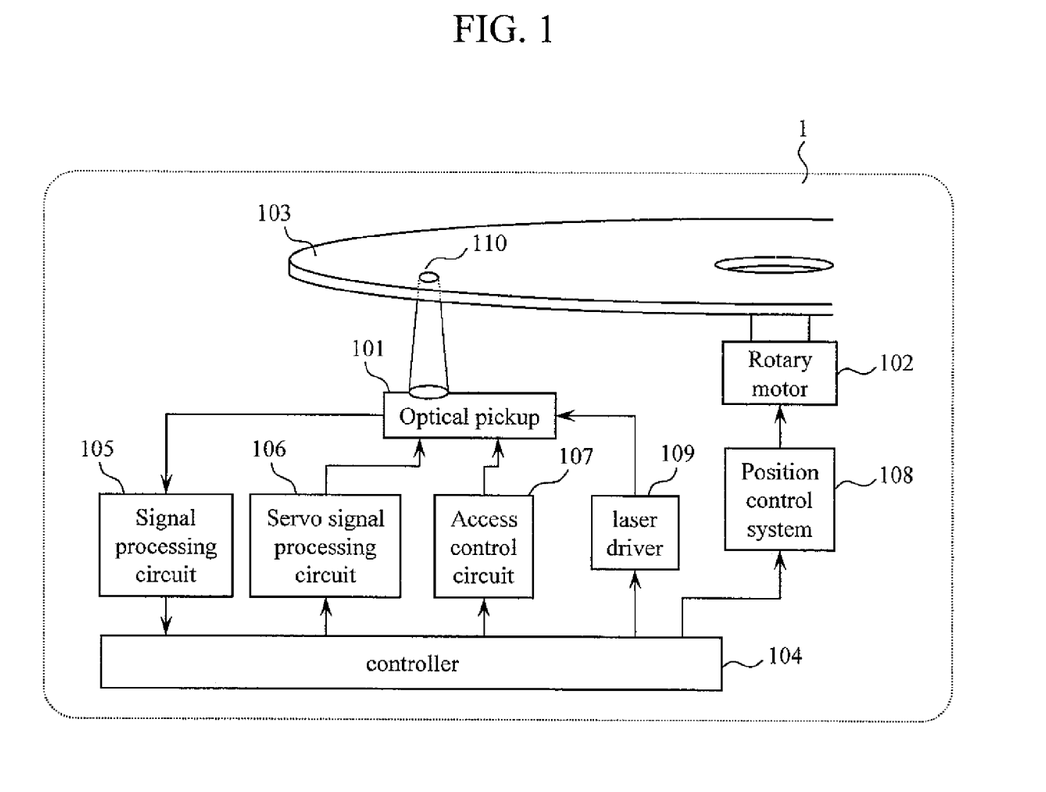
FIG. 1 is a schematic view illustrating a configuration example of an optical information recording and reproducing apparatus according to the present invention.

FIG. 1 illustrates an example of the entire configuration of an optical information recording and reproducing apparatus for achieving an optical signal detection method according to the present invention.

An optical information recording and reproducing apparatus 1 includes an optical pickup 101 and a rotary motor 102. An optical information recording medium 103 is fixed to a rotary shaft of the rotary motor 102 and is thereby rotatably provided. The optical pickup 101 functions to record and/or reproduce digital information by projecting a light onto the optical information recording medium 103. A reproduction light detected by the optical pickup 101 is current/voltage (IV) converted, and input to a signal processing circuit 105. A readout signal and a servo signal are produced by the signal processing circuit 105, and transmitted to a controller 104.

The controller 104 controls a servo control circuit 106, an access control circuit 107, and a position control system 108 based on the servo signal. The position control system 108 controls the rotation of the optical information recording medium 103 by the rotary motor 102. The access control circuit 107 controls the position of the optical pickup 101. The servo control circuit 106 controls the positions of an objective lens and reference light reflecting means of the optical pickup 101 described below. Accordingly, an optical spot 110 is positioned at any given position of the optical information recording medium 103. The controller 104 controls a laser driver 109 depending on whether reproduction or recording is performed, thereby allowing a laser included in the optical pickup 101 described below to emit a light of appropriate power/waveform.

[Configuration (1) of Optical System of Optical Pickup]

Figure 2:
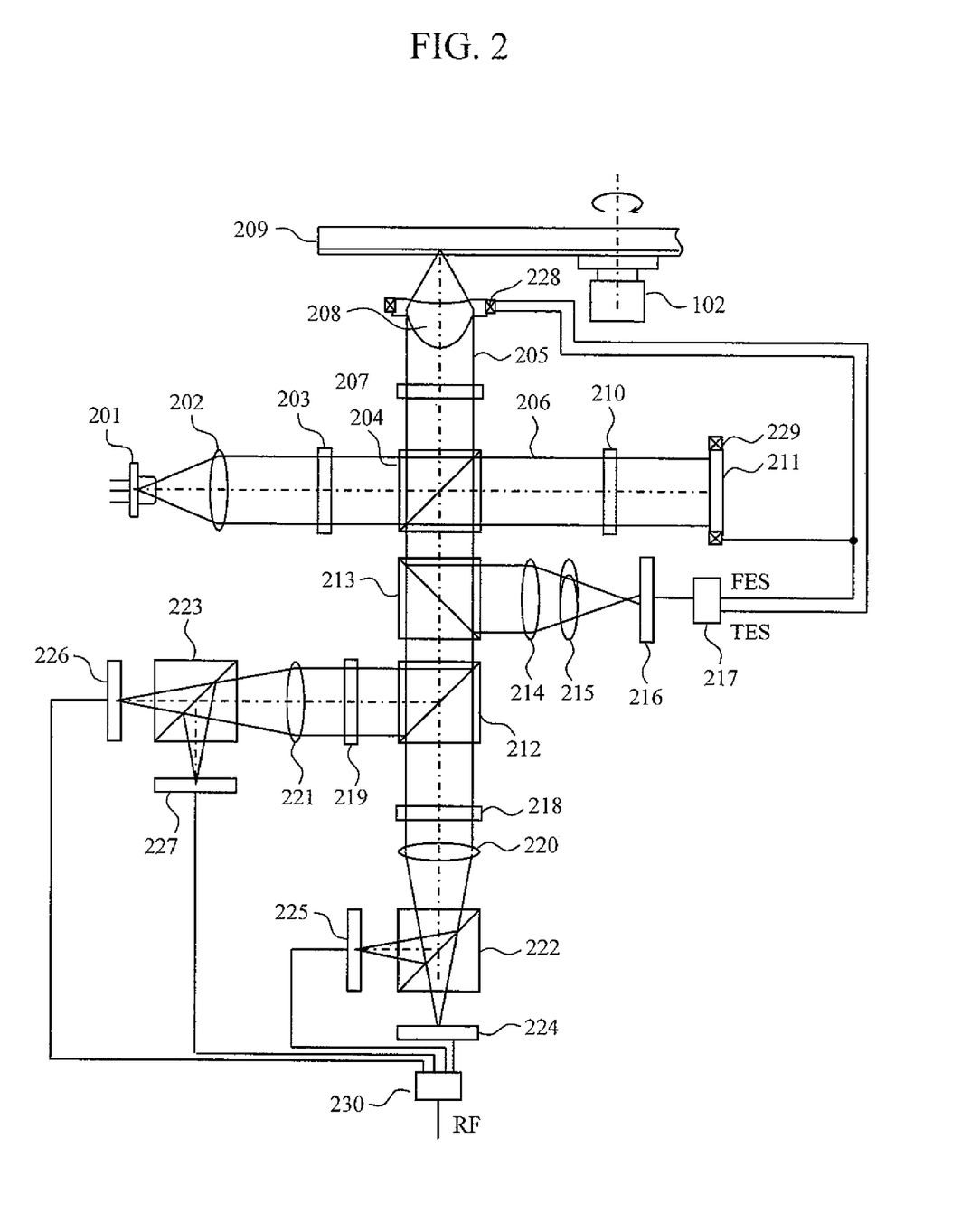
FIG. 2 is a view illustrating a configuration example of an optical pickup which achieves an optical information detection method according to the present invention.

FIG. 2 illustrates a configuration example of the optical system of the optical pickup 101 in the optical information recording and reproducing apparatus 1.

A light emitted from a semiconductor laser 201 that is mounted on the optical pickup 101 is collimated into a collimated light by a collimator lens 202, and transmitted through a first half wave plate 203. The polarization direction thereof is thereby rotated by 45 degrees. The light whose polarization is rotated is split into two linearly polarized lights perpendicular to each other by a first polarizing beam splitter 204. One of the polarized lights (the reproduction light) is reflected, and transmitted through a first quarter wave plate 207 to be converted into a circularly polarized light. The circularly polarized light is collected by an objective lens 208, and focused onto an optical disk 209. A reflected light 205 (referred to as signal light below) from the optical disk 209 is converted back into a collimated light by the objective lens 208, and the collimated light is converted back into a linearly polarized light by the first quarter wave plate 207. Since the rotational direction of the circularly polarized light is inverted by the reflection at the disk surface, the direction of the linearly polarized light is perpendicular to that of the original light. Thus, the signal light 205 is transmitted through the first polarizing beam splitter 204, and travels toward a beam splitter 212. On the other hand, a light 206 (referred to as reference light below) in a polarization direction transmitted through the first polarizing beam splitter 204 first is transmitted through a second quarter wave plate 210 to be converted into a circularly polarized light. The circularly polarized light is reflected by reference light reflecting means 211, and converted into a linearly polarized light that is perpendicular to the original reference light by the second quarter wave plate 210 in a similar manner to the signal light 205. Thus, the linearly polarized light is then reflected by the first polarizing beam splitter 204, and combined with the signal light 205 to travel toward the beam splitter 212. The signal light 205 and the reference light 206 are combined with the polarization directions being perpendicular to each other.

The combined light is partially reflected by a servo beam splitter 213, and guided to a photo detector 216 with astigmatism being imparted thereto by a collective lens 214 and a cylindrical lens 215. A servo signal processing circuit 217 outputs a focus error signal (FES) and a tracking error signal (TES) from the output signal of the photo detector 216. The focus error signal is fed back to a focus drive terminal of a two-dimensional actuator 228 on which the objective lens 208 is mounted, so that a focus position is closed-loop controlled. The same signal is further fed back to a one-dimensional actuator 229 on which the reference light reflecting means 211 is mounted, so that the reference light reflecting means 211 is driven in conjunction with the objective lens 208. Accordingly, a path difference between the signal light 205 reflected from the optical disk 209 and the reference light 206 reflected from the reference light reflecting means 211 can be maintained at substantially 0. Since the coherence length of a normal semiconductor laser is several tens μm, the adjustment accuracy of the path difference is only required to be within the range. The tracking error signal is fed back to a tracking drive terminal of the two-dimensional actuator 228 on which the objective lens 208 is mounted, so that closed-loop control is performed.

Figure 3:
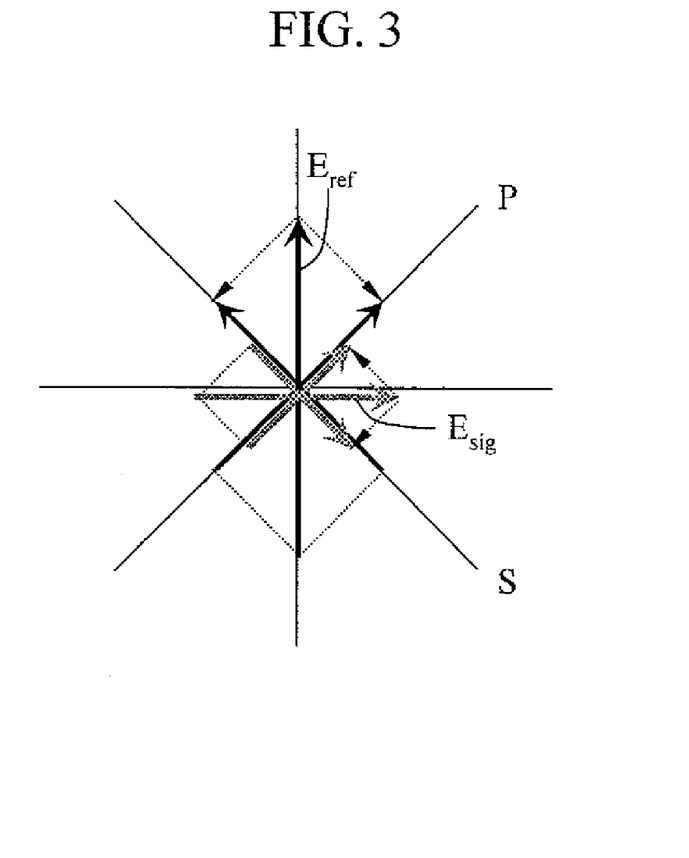
FIG. 3 is a view illustrating the polarization directions of a signal light and a reference light and the polarization direction of a detected light.

One of the combined lights transmitted through the servo beam splitter 213 is transmitted through the beam splitter 212 that is a half mirror. The polarization direction thereof is rotated by 45 degrees by a second half wave plate 218. The light is collected by a lens 220, and split into linearly polarized lights perpendicular to each other by a polarizing beam splitter 222. The linearly polarized lights are detected by a first photo detector 224 (PD1) and a second photo detector 225 (PD2). FIG. 3 illustrates the relationship among polarization components P and S of the lights detected by the two photo detectors PD1 and PD2, the polarization direction ($E_{sig}$) of the signal light, and the polarization direction ($E_{ref}$) of the reference light. The photo detector PD1 detects the P-polarized light, that is, the projection component of $E_{sig}$ and $E_{ref}$ in a P polarization direction. The photo detector PD2 detects the S-polarized light, that is, the projection component of $E_{sig}$ and $E_{ref}$ in an S polarization direction. In the projection component in the S polarization direction, the sign of $E_{ref}$ appears inverted in FIG. 3. Signals detected by the photo detectors PD1 and PD2 are respectively expressed by the following expressions.

$$I_{PD1} = \left| \frac{1}{2} E_{sig} + \frac{1}{2} E_{ref} \right|^2 \qquad (1)$$
$$= \frac{1}{4} |E_{sig}|^2 + \frac{1}{4} |E_{ref}|^2 + \frac{1}{2} |E_{sig}||E_{ref}| \cos(\varphi_{sig} - \varphi_{ref})$$

$$I_{PD2} = \left|\frac{1}{2}E_{sig} - \frac{1}{2}E_{ref}\right|^2 \quad (2)$$

$$= \frac{1}{4}|E_{sig}|^2 + \frac{1}{4}|E_{ref}|^2 - \frac{1}{2}|E_{sig}||E_{ref}|\cos(\varphi_{sig} - \varphi_{ref})$$

In the above expressions, the absolute value is squared since the detected signal is light energy. It is assumed that $E_{sig}$ and $E_{ref}$ are completely coherent for the sake of simplicity.

The other of the combined lights transmitted through the servo beam splitter 213 is reflected by the beam splitter 212 that is a half mirror, and converted into a circularly polarized light by a third quarter wave plate 219 that is arranged by being rotated at 45 degrees relative to the polarization directions of the signal light 205 and the reference light 206. Since the original polarization directions of the signal light 205 and the reference light 206 are different from each other by 90 degrees, the light is converted into a circularly polarized light in an opposite rotational direction. The circularly polarized light is collected by a lens 221, and split into linearly polarized lights perpendicular to each other by a polarizing beam splitter 223. The linearly polarized lights are detected by a third photo detector 226 (PD3) and a fourth photo detector 227 (PD4). FIG. 3 similarly illustrates the relationship among polarization components P and S of the lights detected by the two photo detectors PD3 and PD4, the polarization direction ($E_{sig}$) of the signal light, and the polarization direction ($E_{ref}$) of the reference light. The relationship is different from that of the PD1 and PD2 in that $E_{sig}$ and $E_{ref}$ have a phase difference of 90 degrees. Signals detected by the photo detectors PD3 and PD4 are respectively expressed by the following expressions.

$$I_{PD3} = \left|\frac{1}{2}\exp\left(-i\frac{\pi}{4}\right)E_{sig} + \frac{1}{2}\exp\left(+i\frac{\pi}{4}\right)E_{ref}\right|^2 \quad (3)$$

$$= \frac{1}{4}|E_{sig}|^2 + \frac{1}{4}|E_{ref}|^2 + \frac{1}{2}|E_{sig}||E_{ref}|\sin(\varphi_{sig} - \varphi_{ref})$$

$$I_{PD4} = \left|\frac{1}{2}\exp\left(+i\frac{\pi}{4}\right)E_{sig} + \frac{1}{2}\exp\left(-i\frac{\pi}{4}\right)E_{ref}\right|^2 \quad (4)$$

$$= \frac{1}{4}|E_{sig}|^2 + \frac{1}{4}|E_{ref}|^2 - \frac{1}{2}|E_{sig}||E_{ref}|\sin(\varphi_{sig} - \varphi_{ref})$$

In the expressions, $\exp(\pm i\pi/4)$ represents that $E_{sig}$ and $E_{ref}$ have a phase difference of ±45 degrees (a difference of 90 degrees) at the quarter wave plate.

Thus, a component $|E_{ref}|^2$ that is irrelevant to the information on the optical disk 209 is included in the signals detected by the respective detectors. Therefore, differential signals between the PD1 and the PD2, and between the PD3 and the PD4 are respectively obtained as described below.

$$\text{Sig1} = I_{PD1} - I_{PD2} = |E_{sig}||E_{ref}|\cos(\phi_{sig} - \phi_{ref}) \quad (5)$$

$$\text{Sig2} = I_{PD3} - I_{PD4} = |E_{sig}||E_{ref}|\sin(\phi_{sig} - \phi_{ref}) \quad (6)$$

Signals, each of which is a product of the signal light amplitude intensity and the reference light amplitude intensity, are thereby obtained, which means that when the intensity of the reference light is increased, a larger signal output can be obtained. That is, the intensity of the signal light can be amplified.

The expressions (5) and (6) are accompanied by sin and cos, which represent a phase difference between the signal light and the reference light. However, since the reference light and the signal light pass through separate optical paths and the objective lens 208 tracks the disk by moving up and down by a focus servo in conjunction with the rotation of the disk, the optical path length of the signal light continuously changes. Thus, the phase terms of the expressions (5) and (6) are not fixed, and the signals obtained in this method greatly fluctuate.

Accordingly, the present invention focuses on that the expression (5) is accompanied by cos and the expression (6) is accompanied by sin, a signal is obtained by calculating the square sum of the both signals by a signal operation circuit 230.

$$S = (\text{Sig1})^2 + (\text{Sig2})^2 = |E_{sig}|^2 |E_{ref}|^2 \quad (7)$$

By performing an operation as described above, a constant signal can be stably and reliably obtained even when the signal light and the reference light are changed in phase. By calculating the square sum as shown in the expression (7), the signal proportional to the signal light intensity $|E_{sig}|^2$ is obtained as an output S, and thus, the same signal waveform as those of conventional CD, DVD and BD is obtained in an RF signal. The amplification factor thereof is $|E_{ref}|^2$, which means that the amplification factor can be increased by increasing the reference light intensity. An RF signal may be also obtained by calculating a square root after obtaining the square sum. When the square root is calculated, the output is proportional to the square root of the signal light intensity, and thus, the RF signal has the same signal waveform as that of a conventional magneto-optical disk.

Figure 4:
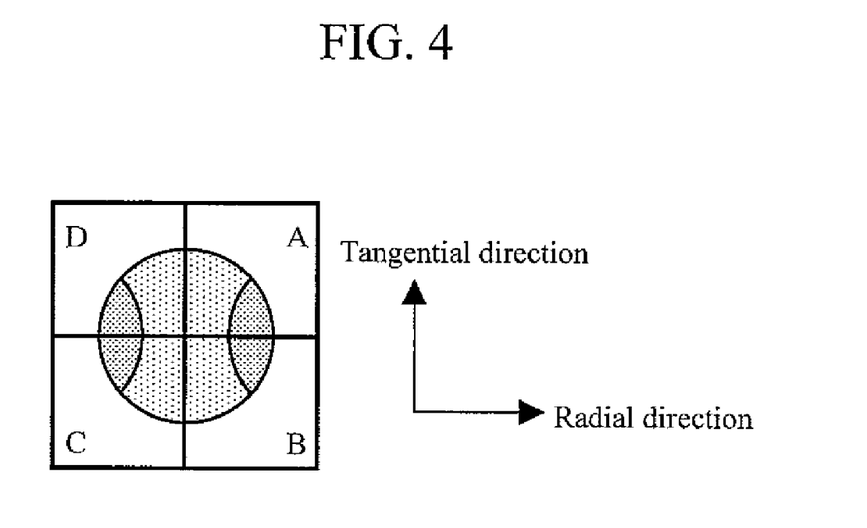
FIG. 4 is a schematic view illustrating a detector in an optical pickup according to the present invention.

Although it is described above that the photo detectors PD1, PD2, PD3 and PD4 output the total light intensities of the received lights, quadrant photo detectors each having four areas A, B, C and D as shown in FIG. 4 may be employed as the four photo detectors PD1, PD2, PD3 and PD4, to separately output the detected light intensities as $I_{PD1}(X)$, $I_{PD2}(X)$, $I_{PD3}(X)$, and $I_{PD4}(X)$ as another operation. Note that X denotes one of the areas A, B, C and D. Differential signals are calculated from signals detected in the areas X (X denotes one of the areas A, B, C and D) of the PD1 and the PD2, and of the PD3 and the PD4 as shown in the following expressions.

$$\text{Sig1}'(X) = I_{PD1}(X) - I_{PD2}(X) = |E_{sig}(X)||E_{ref}(X)|\cos(\phi_{sig} - \phi_{ref}) \quad (8)$$

$$\text{Sig2}'(X) = I_{PD3}(X) - I_{PD4}(X) = |E_{sig}(X)||E_{ref}(X)|\sin((\phi_{sig} - \phi_{ref}) \quad (9)$$

Signals, each of which is a product of the signal light amplitude intensity and the reference light amplitude intensity, are thereby obtained. A signal is further obtained by calculating the square sum of the both signals by the signal operation circuit 230.

$$S'(X) = (\text{Sig1}'(X))^2 + (\text{Sig2}'(X))^2 = |E_{sig}(X)|^2 |E_{ref}(X)|^2 \quad (10)$$

By performing an operation as described above, a constant signal can be stably and reliably obtained even when the signal light and the reference light are changed in phase in a similar manner to the expression (7).

Figure 5A:
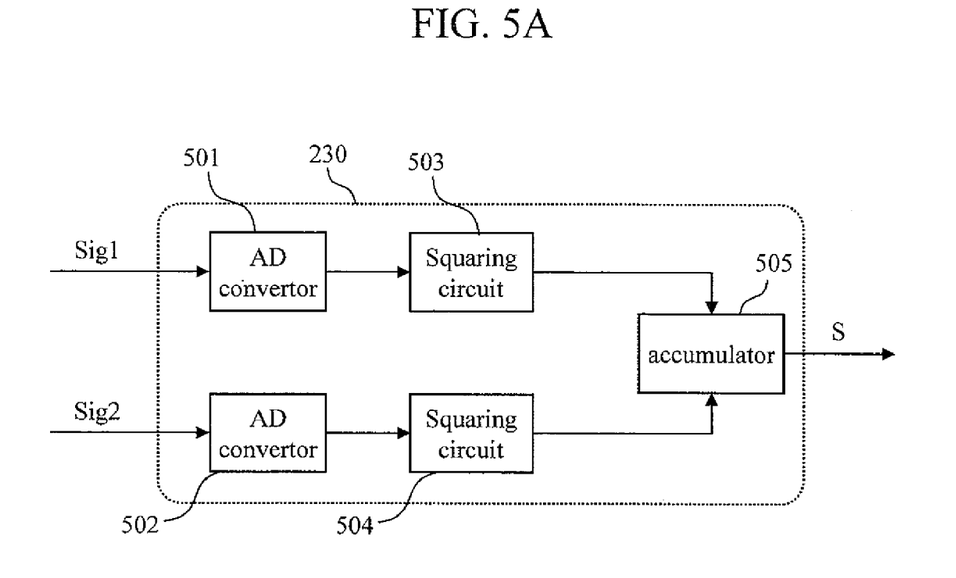
FIG. 5A is a block diagram illustrating a configuration example of a signal operation circuit according to the present invention.
Figure 5B:
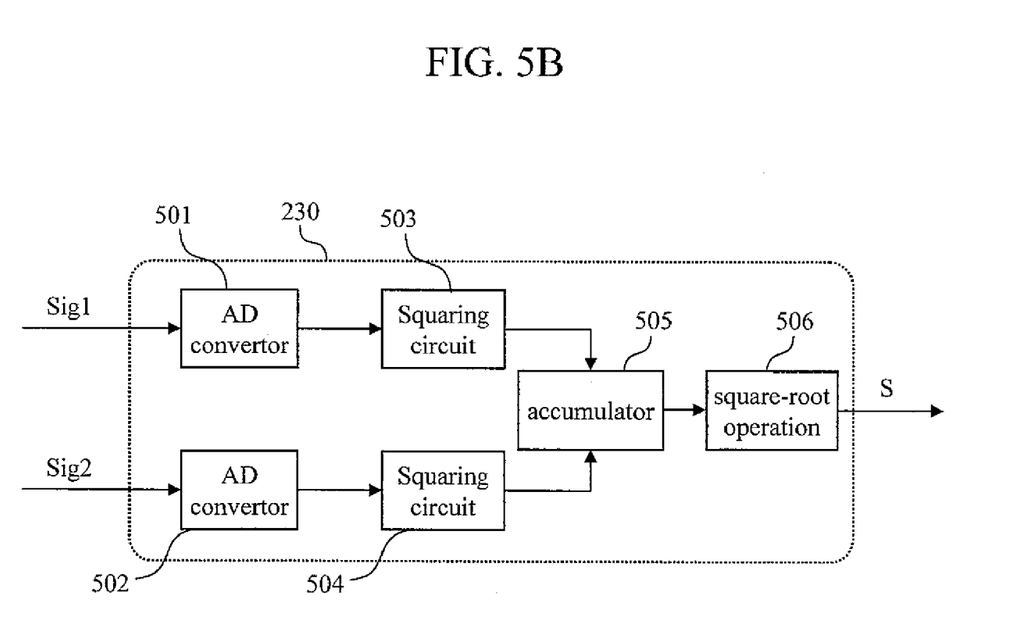
FIG. 5B is a block diagram illustrating a configuration example of a signal operation circuit according to the present invention.

FIG. 5A is a circuit block diagram illustrating a specific configuration example of the signal operation circuit 230. Sig 1 and Sig 2 are digitalized by AD convertors 501 and 502, squared by squaring circuits 503 and 504, and added by an accumulator 505. A digital signal S is thereby obtained. Alternatively, as shown in FIG. 5B, the digital signal S may be obtained by performing a square-root operation by a square-root operation circuit 506 after the addition in the accumulator 505.

Figure 6A:
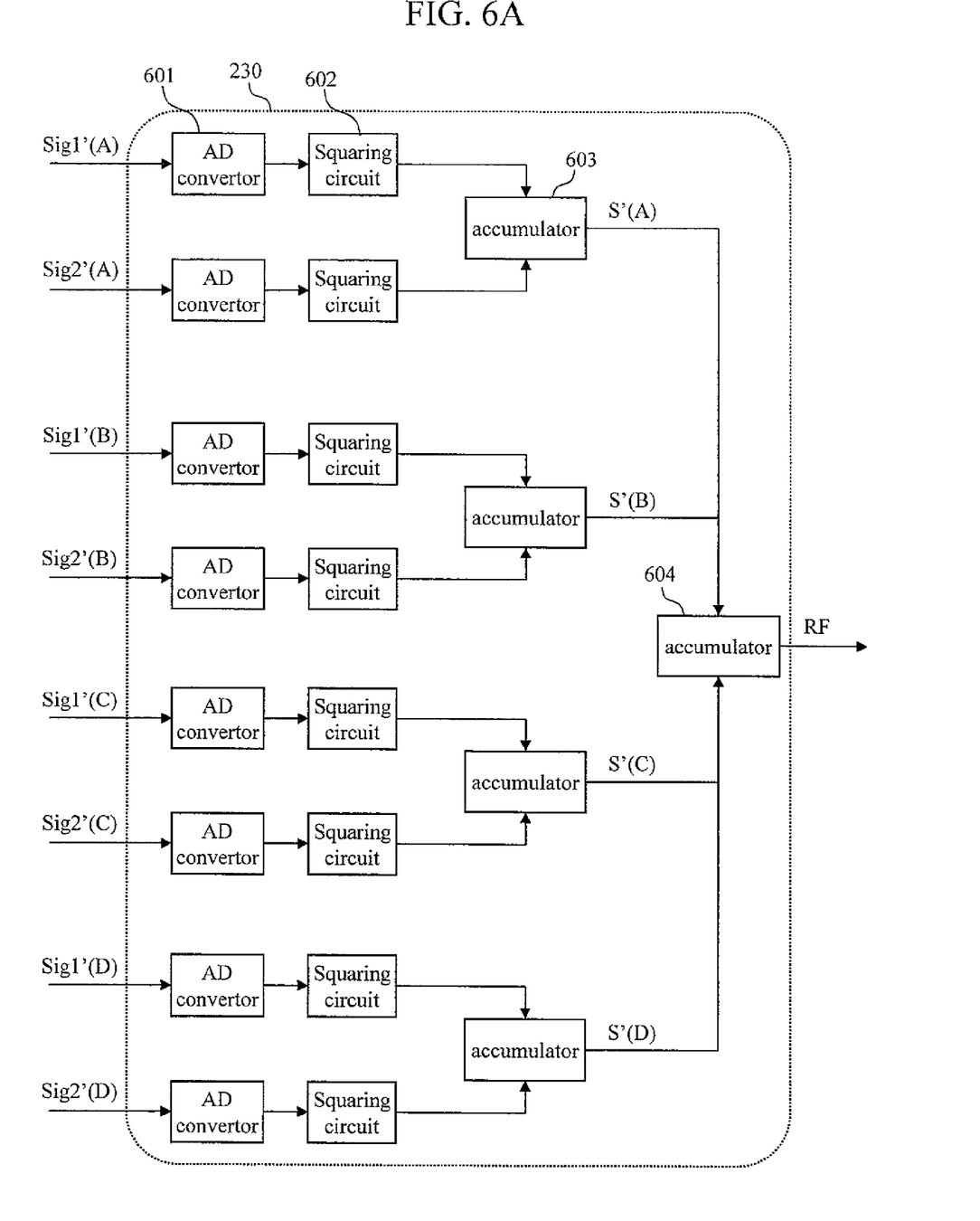
FIG. 6A is a block diagram illustrating a configuration example of a signal operation circuit according to the present invention.

FIG. 6A is a circuit block diagram illustrating another specific configuration example of the signal operation circuit 230 when the four quadrant photo detectors are used in the optical pickup 101. Sig1'(X) and Sig2'(X) are respectively digitalized by AD convertors 601, squared by squaring circuits 602, and added by an accumulator 603. A digital signal S'(X) is thereby obtained. Note that X denotes one of the areas A, B, C and D. Furthermore, the RF signal is obtained by the following operation by an accumulator 604.

$$RF = S'(A) + S'(B) + S'(C) + S'(D) \tag{11}$$

Figure 6B:
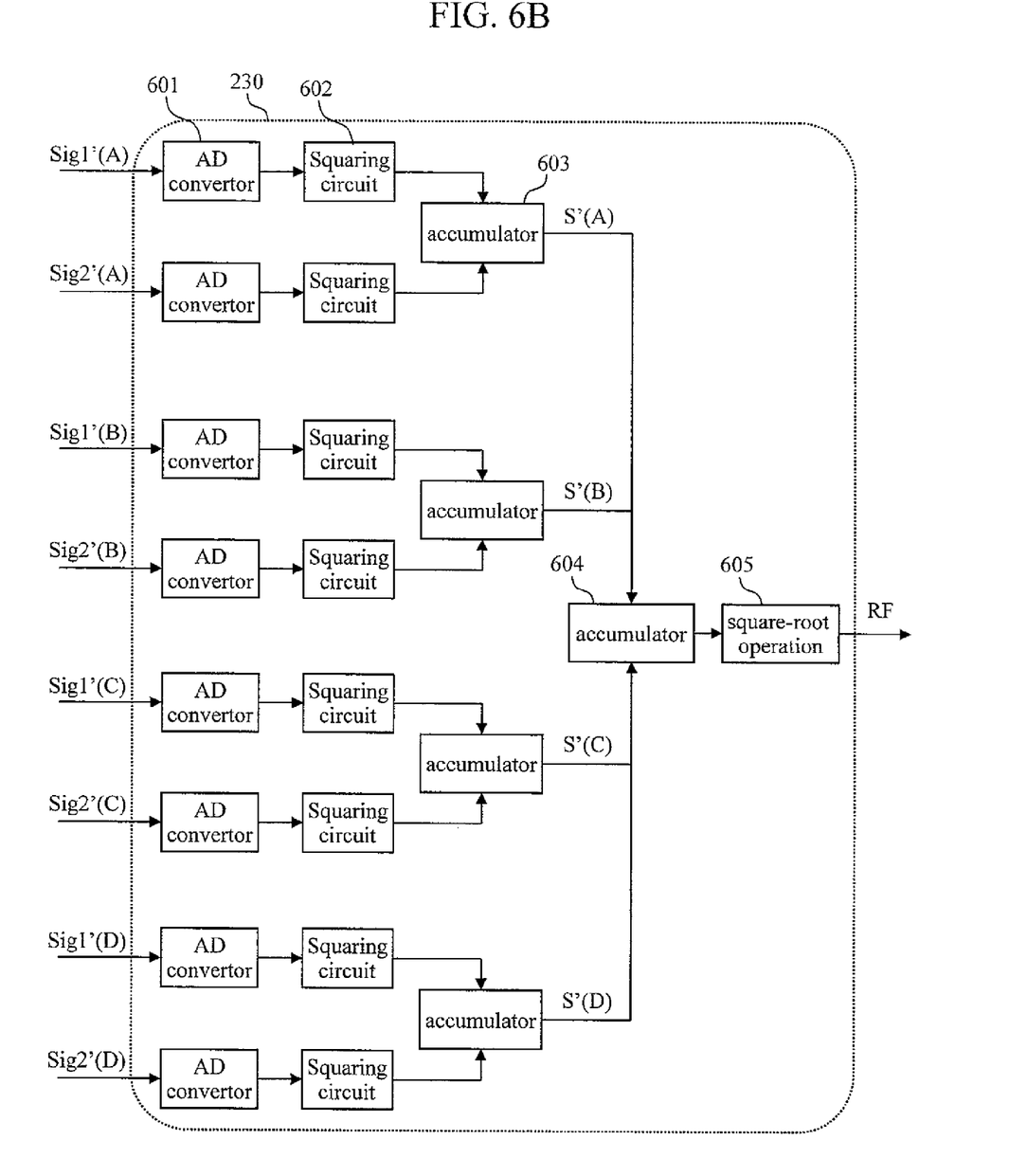
FIG. 6B is a block diagram illustrating a configuration example of a signal operation circuit according to the present invention.

Alternatively, as shown in FIG. 6B, the RF signal may be obtained by performing a square-root operation by a square-root operation circuit 605 after the operation in the expression (11).

The reference light reflecting means 211 is realized by a reflection mirror, for example. In this case, it is necessary to adjust the tilt of the mirror such that the reflected light by the reference light reflecting means 211 is not inclined relative to the optical axis of the incident reference light 206. To this end, the reference light reflecting means 211 may include a mechanism for adjusting the tilt of the wavefront of the reference light 206 by detecting the tilts of the reflection mirror and the wavefront of the reference light 206 and feeding the tilts back to the reference light reflecting means 211. The reference light reflecting means 211 may be also realized by a collective lens and a reflection mirror. The reference light can be reflected in a direction opposite to the incident light by collecting the reference light 206 by the collective lens and placing the reflection mirror at a focus position thereof In this case, even when the reflection mirror is inclined, only the optical axis of the reference light is misaligned with respect to the signal light. Thus, the angle of the reflection mirror is adjusted more easily than in the case where the reference light reflecting means 211 is realized only by the reflection mirror. Alternatively, the reference light reflecting means 211 may be realized by a corner cube reflector. Since the corner cube reflector is an element which always returns the reflected light in the same direction as that of the incident light even when the light is incident at any incident angle, it is not necessary to adjust the tilt of the wavefront.

The servo control circuit 106 in FIG. 1 controls the focus of the objective lens 208 by the two-dimensional actuator 228 based on the servo signal, and at the same time, controls the position of the reference light reflecting means 211 via the one-dimensional actuator 229 in accordance with the change in the optical path length of the signal light along with the movement of the objective lens 208, so that a difference in the optical path length between the reference light and the signal light is always 20 μm or less. The length of 20 μm is sufficiently smaller than a coherence length of 70 μm of the semiconductor laser 201 used in the present embodiment. Therefore, the reference light and the signal light are always maintained at a substantially completely coherent state.

FIG. 2 is a view illustrating a light beam at the time of reproducing the information recorded on the optical disk 209, wherein the light from the semiconductor laser 201 is split into two light beams of the signal light 205 and the reference light 206. Since the reference light is unnecessary in recording, the light transmitted through the first half wave plate 203 may be converted into an S-polarized light, and all the S-polarized light may be reflected by the first polarizing beam splitter 204 to be used as the signal light. This is realized by changing the intensity ratio of the signal light and the reference light by rotating the first half wave plate at the time of recording and reproducing, for example. Alternatively, a liquid crystal wave plate in which the polarization direction of the incident light is switched when a voltage is applied may be used, or a method of inserting and removing the half wave plate may be also used.

[Configuration (2) of Optical System of Optical Pickup]

Figure 7:
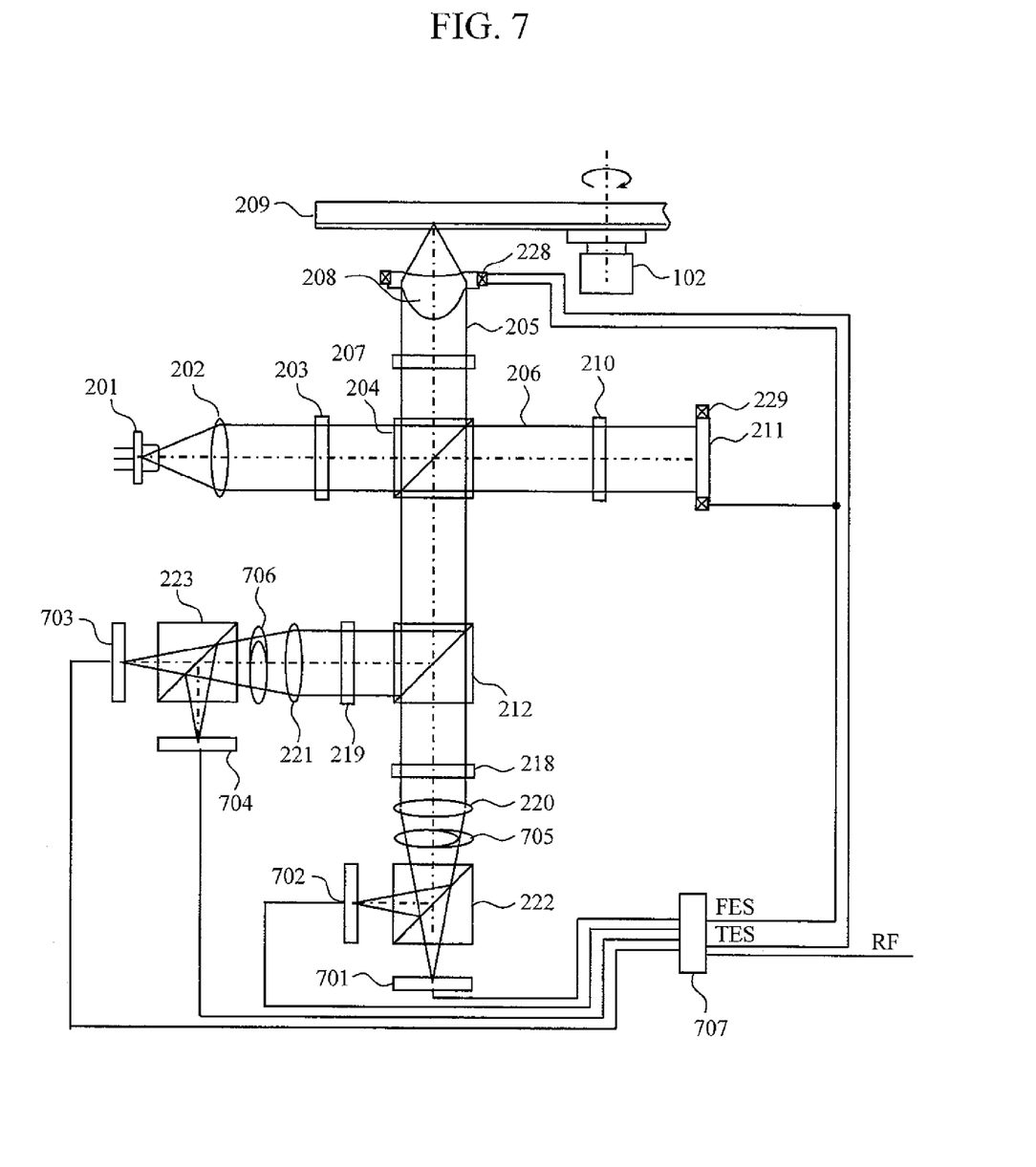
FIG. 7 is a view illustrating a configuration example of an optical pickup which achieves an optical information detection method according to the present invention.

FIG. 7 illustrates another configuration example of the optical system of the optical pickup 101 in the optical information recording and reproducing apparatus 1. In the optical pickup 101 shown in FIG. 2, the RF signal and the servo signal (the focus error signal and the tracking error signal) are detected by the separate detection systems. However, the RF signal and the servo signal may be detected by the same detection system as shown in FIG. 7. The quadrant photo detectors as shown in FIG. 4 are employed as photo detectors 701, 702, 703 and 704. Astigmatism is imparted to the signal light by cylindrical lenses 705 and 706. The signal light is then guided to the photo detectors 701, 702, 703 and 704. A signal operation circuit 707 outputs an RF signal and a servo signal from the output signals thereof. An astigmatic method is used to detect the focus error signal and a push-pull method is used to detect the tracking error signal.

A differential push-pull method may be also used to detect the tracking error signal by placing a grating in the optical path of the signal light 205. In the differential push-pull method, the light incident on the optical disk 209 is divided into three beams by the grating. When a main spot on the disk is positioned on an information track, the rotation of the grating is adjusted such that two sub spots are positioned between the adjacent tracks. The reference light is also divided into three beams. The three beams are respectively caused to interfere with the corresponding beams of the signal light, thereby amplifying the tracking error signal by a differential operation.

Figure 8:
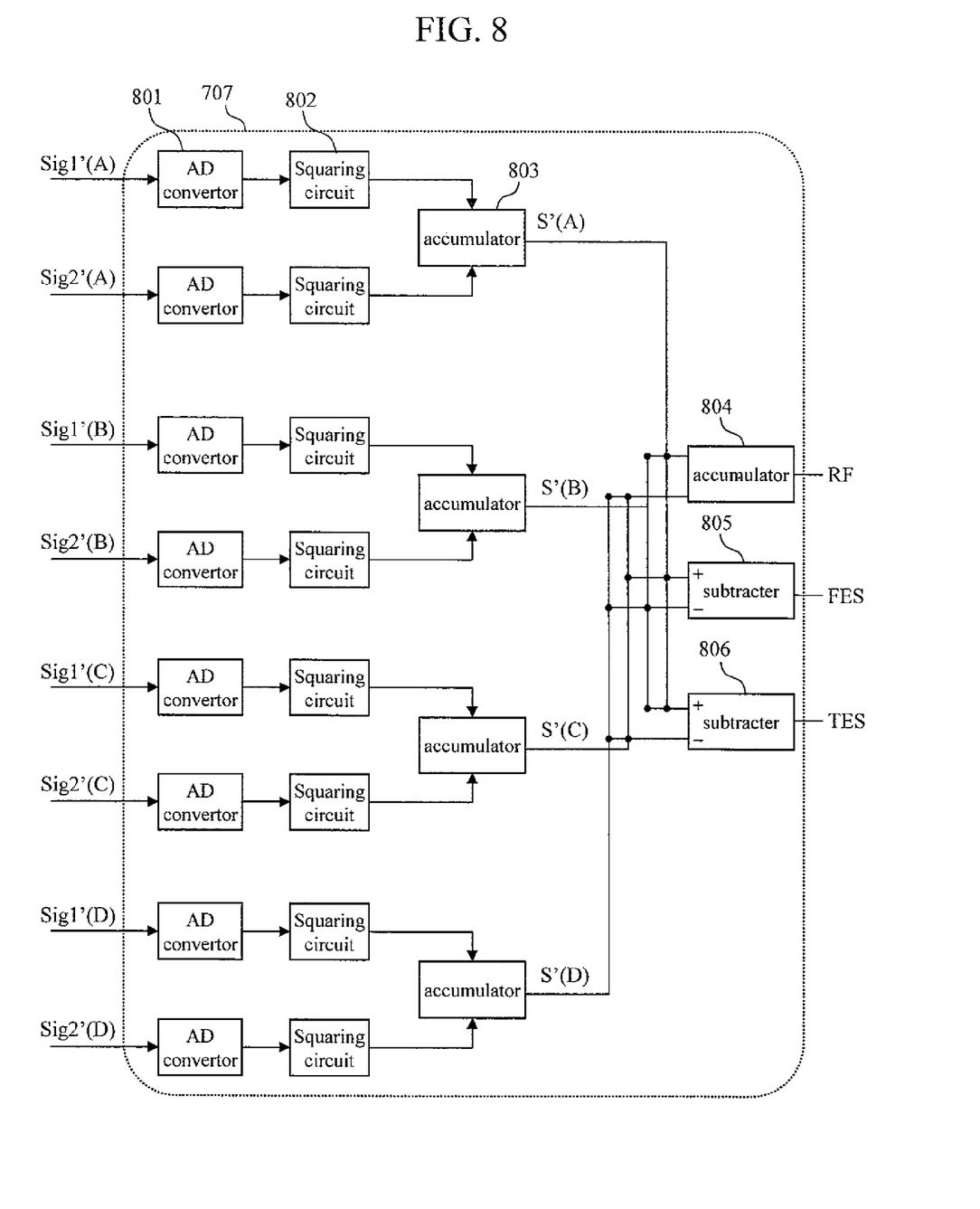
FIG. 8 is a block diagram illustrating a configuration example of a signal operation circuit according to the present invention.

FIG. 8 is a circuit block diagram illustrating a specific example of the signal operation circuit 707. Sig1'(X) and Sig2'(X) are respectively digitalized by AD convertors 801, squared by squaring circuits 802, and added by an accumulator 803. A digital signal S'(X) is thereby obtained. Note that X denotes one of the areas A, B, C and D. Furthermore, the RF signal and the servo signal (the focus error signal and the tracking error signal) can be obtained by the following operation by an accumulator 804 and subtracters 805 and 806.

$$RF = S'(A) + S'(B) + S'(C) + S'(D)$$

$$FES = S'(A) + S'(C) - S'(B) - S'(D)$$

$$TES = S'(A) + S'(B) - S'(C) - S'(D) \tag{12}$$

Alternatively, the RF signal may be obtained by performing a square-root operation by a square-root operation circuit after the addition in the accumulator 804. With the configuration, in a case of using a multilayer disk, the signal of a light from a layer to be detected can be selectively amplified against signal leakage from the adjacent layers (different layers from the layer to be detected, which are displaced in an optical axis direction from the light collecting point of the objective lens). Crosstalk can be thereby more effectively reduced.

[Configuration (3) of Optical Pickup Optical System]

Figure 9:
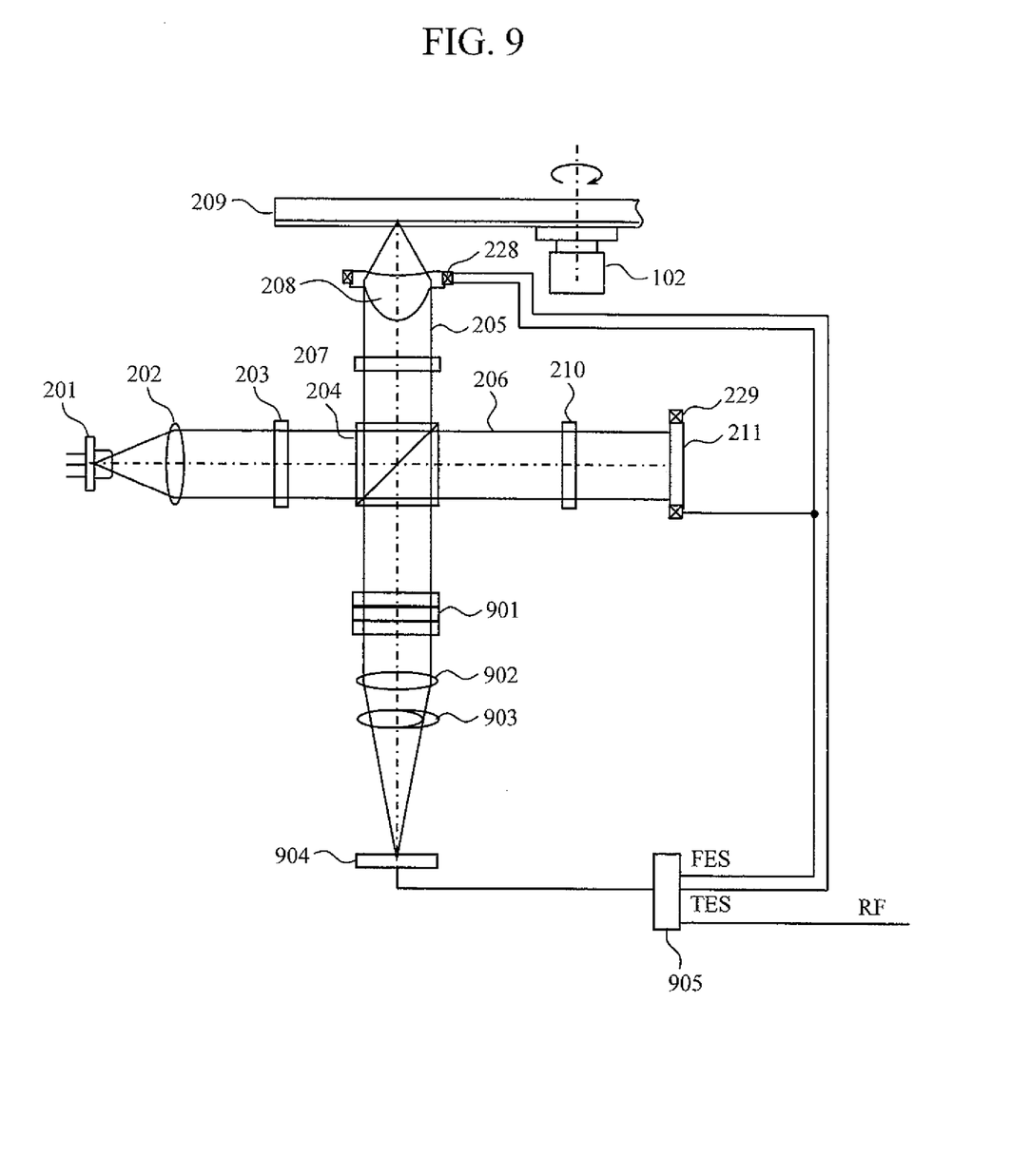
FIG. 9 is a view illustrating a configuration example of an optical pickup which achieves an optical information detection method according to the present invention.

FIG. 9 illustrates another configuration example of the optical system of the optical pickup 101 in the optical information recording and reproducing apparatus 1. In the optical pickup shown in FIGS. 2 and 7, the signals shown in the expressions (1), (2), (3) and (4) are detected by the separate photo detectors. In a present embodiment, however, the lights are received by a photo detector 904 in which the photo detectors are packaged into one detector, and a signal operation circuit 905 performs a signal operation. The signal light reflected by the optical disk 209 and the reference light reflected by the reference light reflecting means 211 enter a polarization convertor and retarder 901, and divided into four lights having different phase differences due to the interference between the two lights. The four lights are respectively detected by four photo receiving sections provided on the quadrant photo detector 904 by a collective lens 902 and a cylindrical lens 903.

Figure 10:
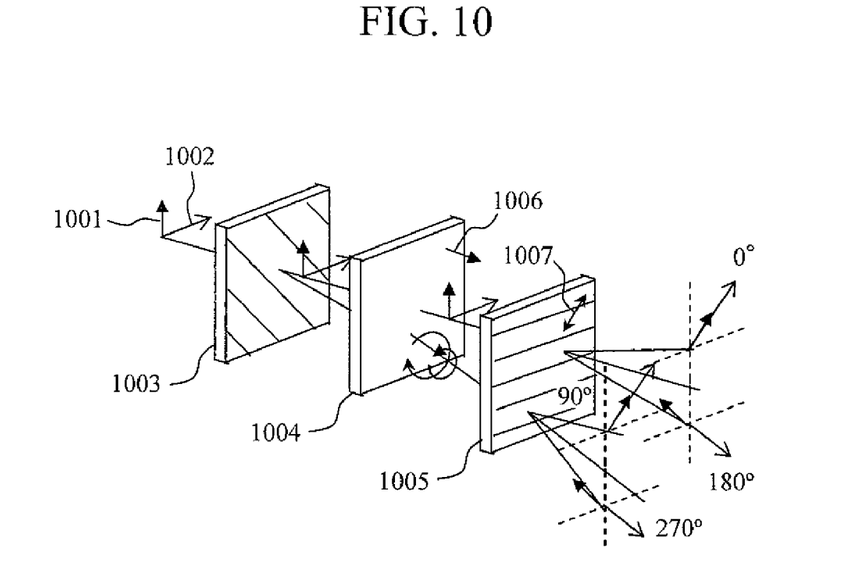
FIG. 10 is a view illustrating a polarization convertor and retarder according to the present invention.

FIG. 10 is a view illustrating the configuration and function of the polarization convertor and retarder 901. The polarization convertor and retarder 901 includes a non polarizing grating 1003, a retarder which has angle selectivity 1004 which converts a polarization direction, and a polarization splitting grating 1005. Although shown in an integrated manner in FIG. 9, the elements 1003 to 1005 are separately shown in FIG. 10 for the convenience of description. There is no difference in the function whether the elements 1003 to 1005 are integrated or separated.

When the signal light and the reference light enter the non polarizing grating 1003 such that a signal light polarization direction 1001 and a reference light polarization direction 1002 are perpendicular to each other, the two lights are respectively split into two lights in different traveling directions regardless of the polarization directions. This is easily achieved by brazing the non polarizing grating 1003. One of the lights is a zero-order light which travels in a straight line, and the other of the lights is a first-order diffracted light which is diffracted at a predetermined diffraction angle. Subsequently, the lights enter the retarder which has angle selectivity 1004. Here, no phase difference occurs in the zero-order light which travels in a straight line. In the first-order diffracted light which is incident at a tilt, however, there occurs a phase difference of 90 degrees between the signal light and the reference light. To this end, an optical axis 1006 needs to have uniaxial anisotropy perpendicular to the incident surface of the retarder which has angle selectivity, and the diffracting direction of the diffracted light of the non polarizing grating needs to correspond to the signal light polarization direction 1001 or the reference light polarization direction 1002. The phase difference between the signal light component and the reference light component of the first-order diffracted light can be uniquely determined based on the thickness of the retarder which has angle selectivity 1004, the refractive index anisotropy (a difference between a vertical refractive index and an in-plane refractive index), and the incident angle of the first-order diffracted light.

The emission lights from the retarder which has angle selectivity 1004 further enter the polarization splitting grating 1005. For example, an element disclosed in JP Patent No. 3832243 can be used as the polarization splitting grating. This is easily achieved by forming a blazed grating using an anisotropic material such as liquid crystal, lithium niobate, and crystal. That is, since the material has a different refractive index depending on the polarization direction, the polarization splitting grating may be arranged such that a phase distribution applied by the grating is inverted in accordance with a given polarization direction and a polarization direction perpendicular thereto. Accordingly, the first-order diffracted light and a minus first-order diffracted light can have polarization directions perpendicular to each other. Alternatively, an element formed by cementing anisotropic optical crystals such as a Wollaston prism may be used instead. The directions of polarization to be split in the present embodiment are a direction of 45 degrees relative to the signal light and the reference light and a direction perpendicular thereto. The phase difference in the interference between the signal light component and the reference light component in the four lights split as described above can be set to 0 degree, 90 degrees, 180 degrees and 270 degrees as shown in FIG. 10.

Figure 11:
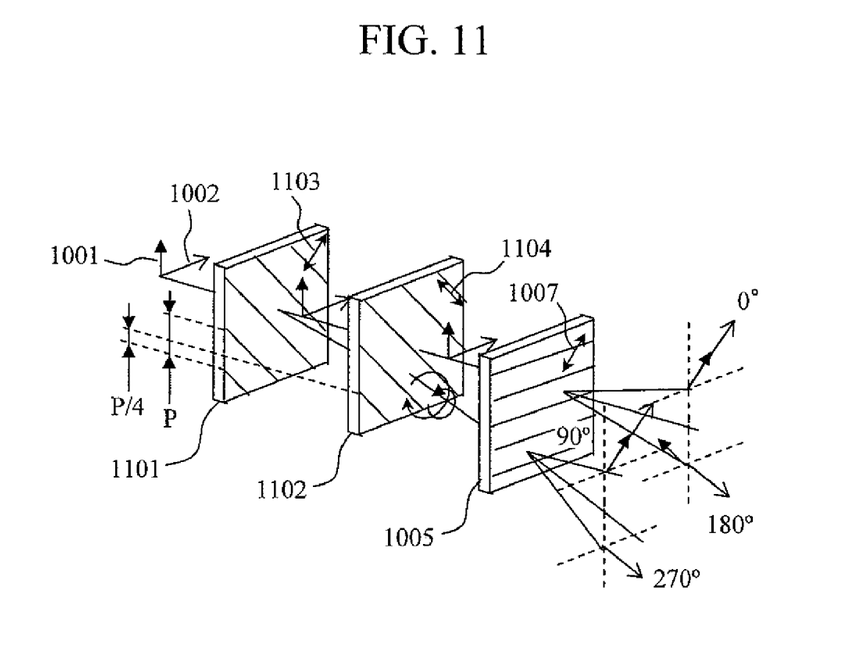
FIG. 11 is a view illustrating a polarization convertor and retarder according to the present invention.

FIG. 11 is a view illustrating a different embodiment from the retarder which has angle selectivity shown in FIG. 10. A polarizing grating 1101 is provided instead of the non polarizing grating 1003 in FIG. 10. Furthermore, a second polarizing grating 1102 is provided instead of the retarder which has angle selectivity 1004. Optical axis directions 1103 and 1104 thereof are arranged perpendicular to each other as shown in FIG. 11.

The subsequent polarizing grating 1005 is arranged in the same manner as that shown in FIG. 10. In such a manner, a light having a linear polarization component along the optical axis 1103 is partially diffracted by the first polarizing grating 1101. A light having a linear polarization component along the optical axis 1104 is partially diffracted by the second polarizing grating 1102. Accordingly, the lights diffracted by the first and second polarizing gratings have polarization directions perpendicular to each other. Furthermore, the phase of the grating arrangement is shifted only by one fourth (90 degrees) of a grating period P as shown in FIG. 11. In such a manner, the phases of the diffracted lights are also shifted from each other by 90 degrees, so that a polarization state obtained by combining the two diffracted lights is a circular polarization state. Only one diffracted light is shown here, and this is easily realized by brazing the grating such as a step grating and a brazed grating. Moreover, by diffracting the lights having the polarization components perpendicular to each other by the first and second polarizing gratings at an equal light intensity ratio, the polarization state of the light which is not diffracted can be maintained in the same polarization state as that of the light which is incident first. Although the elements are separately shown in FIG. 11 for the convenience of description, the elements can be cemented together and thereby integrated in an actual optical system.

In the configuration, although the non polarizing grating is replaced with the polarizing grating, the retarder which has angle selectivity made of a relatively expensive anisotropic optical crystal is replaced with the polarizing grating which can be easily formed by solidification of liquid crystal or the like, and thus, the cost is relatively reduced in comparison with the configuration shown in FIG. 10. In order to generate the phase difference of 90 degrees at the retarder which has angle selectivity, it is necessary to increase the light beam incident angle, or the element thickness. In the present embodiment, however, the phase difference between the circularly polarized lights can be achieved by any given grating pitch. The element can be thereby effectively reduced in size.

In the aforementioned embodiments, the example in which the light from a single light source is divided is described. However, first and second light beams emitted from two light sources having longer coherence lengths than a distance that a light travels in a vacuum within a time period corresponding to the data acquisition period of the readout signal may be also used instead of using the divided lights from the single light source. In this case, the wavelengths of the two light sources need to substantially match each other. Since the light interference state is almost constant during the data acquisition of the readout signal, the aforementioned effects of the present invention can be similarly obtained.

The optical system in the present invention is not limited to the ones shown in FIGS. 2, 7 and 9. For example, as an optical element for obtaining signal outputs in four phase difference states different from each other by 90 degrees, a composite optical functional element such as a polarization control prism, a polarizing diffractive optical element, and a nano-photonic material may be employed in addition to the optical system using the half wave plates 203 and 218, and the quarter wave plate 219. In any case, by forming an optical system capable of obtaining signal outputs in at least four states in which the phase difference states between the signal light and the reference light are different from each other and performing a signal operation/selection, the effects of the present invention can be obtained.

The effects of the present invention are not limited to the optical pickup for amplifying the readout signal of the optical disk. For example, the effects of the present invention can be also obtained when the light intensity of the signal light is amplified by causing the signal light to interfere with another light (the reference light) by use of a homodyne detection method such as signal amplification of a carrier wave in optical communication and amplification of a detected signal in optical measurement.

DESCRIPTION OF SYMBOLS

1 Optical information recording and reproducing apparatus
101 Optical pickup
102 Rotary motor
103 Optical information recording medium
104 Controller
105 Signal processing circuit
106 Servo control circuit
107 Access control circuit
108 Position control system
109 Laser driver
110 Optical spot
201 Semiconductor laser
202 Collimator lens
203 Half wave plate
204 Polarizing beam splitter
205 Signal light
206 Reference light
207 Quarter wave plate
208 Objective lens
209 Optical disk
210 Quarter wave plate
211 Reference light reflecting means
212 Beam splitter
213 Servo beam splitter
214 Collective lens
215 Cylindrical lens
216 Photo detector
217 Servo circuit
218 Half wave plate
219 Quarter wave plate
220, 221 Lens
222, 223 Polarizing beam splitter
224 First photo detector
225 Second photo detector
226 Third photo detector
227 Fourth photo detector
228 Two-dimensional actuator
229 One-dimensional actuator
230 Signal operation circuit
501, 502 AD convertor
503, 504 Squaring circuit
505 Accumulator
506 Square-root operation circuit
601 AD convertor
602 Squaring circuit
603, 604 Accumulator
605 Square-root operation circuit
701, 702, 703, 704 Photo detector
705, 706 Cylindrical lens
707 Signal operation circuit
801 AD convertor
802 Squaring circuit
803, 804 Accumulator
805, 806 Subtracter
901 Polarization convertor and retarder
902 Collective lens
903 Cylindrical lens
904 Photo detector
905 Signal operation circuit
1001 Signal light polarization direction
1002 Reference light polarization direction
1003 Non polarizing grating
1004 Retarder which has angle selectivity
1005 Polarization splitting grating
1006, 1007 Optical axis
1101, 1102 Polarizing grating
1103, 1104 Optical axis

What is claimed is:

1. An optical information detection method comprising the steps of:
    dividing a light beam emitted from a light source into a first light beam and a second light beam;
    focusing the first light beam onto an optical information recording medium;
    guiding a signal light reflected from the optical information recording medium to a first photo detector, a second photo detector, a third photo detector, and a fourth photo detector, each photo detector having regions A, B, C, and D;
    guiding the second light beam as a reference light to the first, second, third, and fourth photo detectors without focusing the second light beam onto the optical information recording medium;
    causing the signal light and the reference light to optically interfere with each other on the first, second, third, and fourth photo detectors such that phase relationships between the signal light and the reference light are different from each other by 180 degrees on the first and second photo detectors, by 180 degrees on the third and fourth photo detectors, and by 90 degrees on the first and third photo detectors;
    computing a first differential between a signal from a region A, B, C, or D of the first photo detector and a signal from the corresponding region of the second photo detector, then computing the square of the first differential; and
    computing a second differential between a signal from the corresponding region of the third photo detector and a signal from the corresponding region of the fourth photo detector, then computing the square of the second differential; and
    computing signals S'(A), S'(B), S'(C), and S'(D), each representing the sum of the square of the first differential and the square of the second differential for a respective region A, B, C, or D; and
    computing a focus error signal by calculating the value of S'(A)+S'(C)−S'(B)−S'(D).

2. The optical information detection method according to claim 1, further comprising:
    obtaining a tracking error signal by calculating the value of S'(A)+S'(B)−S'(C)−S'(D).

3. An optical pickup, comprising:
    a laser;
    a first optical element configured to branch a light beam from the laser into a first light beam and a second light beam;

an objective lens configured to focus the first light beam onto a recording film surface of an optical information recording medium, and configured to receive a reflected light;

a reference light beam reflecting means provided in an optical path of the second light beam;

a first photo detector, a second photo detector, a third photo detector, and a fourth photo detector, each photo detector having regions A, B, C, and D;

a second optical element configured to branch a light beam obtained by combining the first light beam reflected by the optical information recording medium and the second light beam reflected by the reference light beam reflecting means, and configured to allow the branched light beams to enter the first photo detector and the second photo detector;

a third optical element configured to combine the first light beam reflected by the optical information recording medium and the second light beam reflected by the reference light beam reflecting means in a state in which a phase relationship is different from that of the light beam combined by the second optical element by 90 degrees, configured to branch the combined light beam, and configured to allow the branched light beams to enter the third photo detector and the fourth photo detector;

wherein phase relationships between the first light beam and the second light beam are different from each other by 180 degrees on the first and second photo detectors, by 180 degrees on the third and fourth photo detectors, and by 90 degrees on the first and third photo detectors;

an operation circuit configured to perform an operation on outputs of the first, second, third and fourth photo detectors, wherein the operation circuit is configured to:

compute a first differential between a signal from a region A, B, C, or D of the first photo detector and a signal from the corresponding region of the second photo detector, then compute the square of the first differential, and compute a second differential between a signal from the corresponding region of the third photo detector and a signal from the corresponding region of the fourth photo detector, then compute the square of the second differential, and compute signals S'(A), S'(B), S'(C), and S'(D), each representing the sum of the square of the first differential and the square of the second differential for a respective region A, B, C, or D, and compute a focus error signal by calculating the value of S'(A)+S'(C)−S'(B)−S'(D).

4. The optical pickup according to claim 3, wherein the operation circuit is further configured to obtain a tracking error signal by calculating the value of S'(A)+S'(B)−S'(C)−S'(D).

5. The optical pickup according to claim 3, wherein the first, second, third and fourth photo detectors are formed on a same substrate.

6. An optical information recording and reproducing apparatus comprising:

a motor configured to hold and to rotate an optical information recording medium on a rotary shaft;

a servo control circuit; and an optical pickup configured to project a light onto the optical information recording medium and configured to detect a reflected signal, the optical pickup including:

a laser;

a first optical element configured to branch a light beam from the laser into a first light beam and a second light beam;

an objective lens configured to focus the first light beam onto a recording film surface of the optical information recording medium, and configured to receive a reflected light;

a reference light beam reflecting means provided in an optical path of the second light beam;

a first photo detector, a second photo detector, a third photo detector, and a fourth photo detector, each photo detector having regions A, B, C, and D a second optical element configured to branch a light beam obtained by combining the first light beam reflected by the optical information recording medium and the second light beam reflected by the reference light beam reflecting means, and configured to allow the branched light beams to enter the first photo detector and the second photo detector;

a third optical element configured to combine the first light beam reflected by the optical information recording medium and the second light beam reflected by the reference light beam reflecting means in a state in which a phase relationship is different from that of the light beam combined by the second optical element by 90 degrees, configured to branch the combined light beam, and configured to allow the branched light beams to enter the third photo detector and the fourth photo detector; and wherein phase relationships between the first light beam and the second light beam are different from each other by 180 degrees on the first and second photo detectors, by 180 degrees on the third and fourth photo detectors, and by 90 degrees on the first and third photo detectors; and an operation circuit configured to perform an operation on outputs of the first, second, third and fourth photo detectors, wherein the operation circuit is configured to:

compute a first differential between a signal from a region A, B, C, or D of the first photo detector and a signal from the corresponding region of the second photo detector, then compute the square of the first differential, and compute a second differential between a signal from the corresponding region of the third photo detector and a signal from the corresponding region of the fourth photo detector, then compute the square of the second differential, and compute signals S'(A), S'(B), S'(C), and S'(D), each representing the sum of the square of the first differential and the square of the second differential for a respective region A, B, C, or D, and compute a focus error signal by calculating the value of S'(A)+S'(C)−S'(B)−S'(D);

wherein based on the focus error signal, the servo control circuit compensates for a focus error by controlling a position of the objective lens in an optical axis direction, and adjusts a position of the reference light beam reflecting means in the optical axis direction such that a path difference between a signal light and a reference light is within a coherence length of the semiconductor laser.

7. The optical information detection method according to claim 1, further comprising:

obtaining a readout signal (RF) by calculating the value of S'(A)+S'(B)−S'(C)−S'(D), or by performing a square root operation to a result of calculating the value of S'(A)+S'(B)−S'(C)−S'(D).

8. The optical information detection method according to claim 1, wherein the first, second, third and fourth photo detectors are formed on a same substrate.

9. The optical pickup according to claim 3, wherein the operation circuit is configured to obtain a readout signal (RF) by calculating the value of S'(A)+S'(B)−S'(C)−S'(D), or by performing a square root operation to a result of calculating the value of S'(A)+S'(B)−S'(C)−S'(D).

10. The optical information recording and reproducing apparatus according to claim 6, wherein the operation circuit is configured to obtain a tracking error signal by calculating the value of S'(A)+S'(B)−S'(C)−S'(D).

11. The optical information recording and reproducing apparatus according to claim 6, wherein the first, second, third and fourth photo detectors are formed on a same substrate.

12. The optical information recording and reproducing apparatus according to claim 6, wherein the operation circuit is configured to obtain a readout signal (RF) by calculating the value of S'(A)+S'(B)−S'(C)−S'(D), or by performing a square root operation to a result of calculating the value of S'(A)+S'(B)−S'(C)−S'(D).

* * * * *